Figure 5:
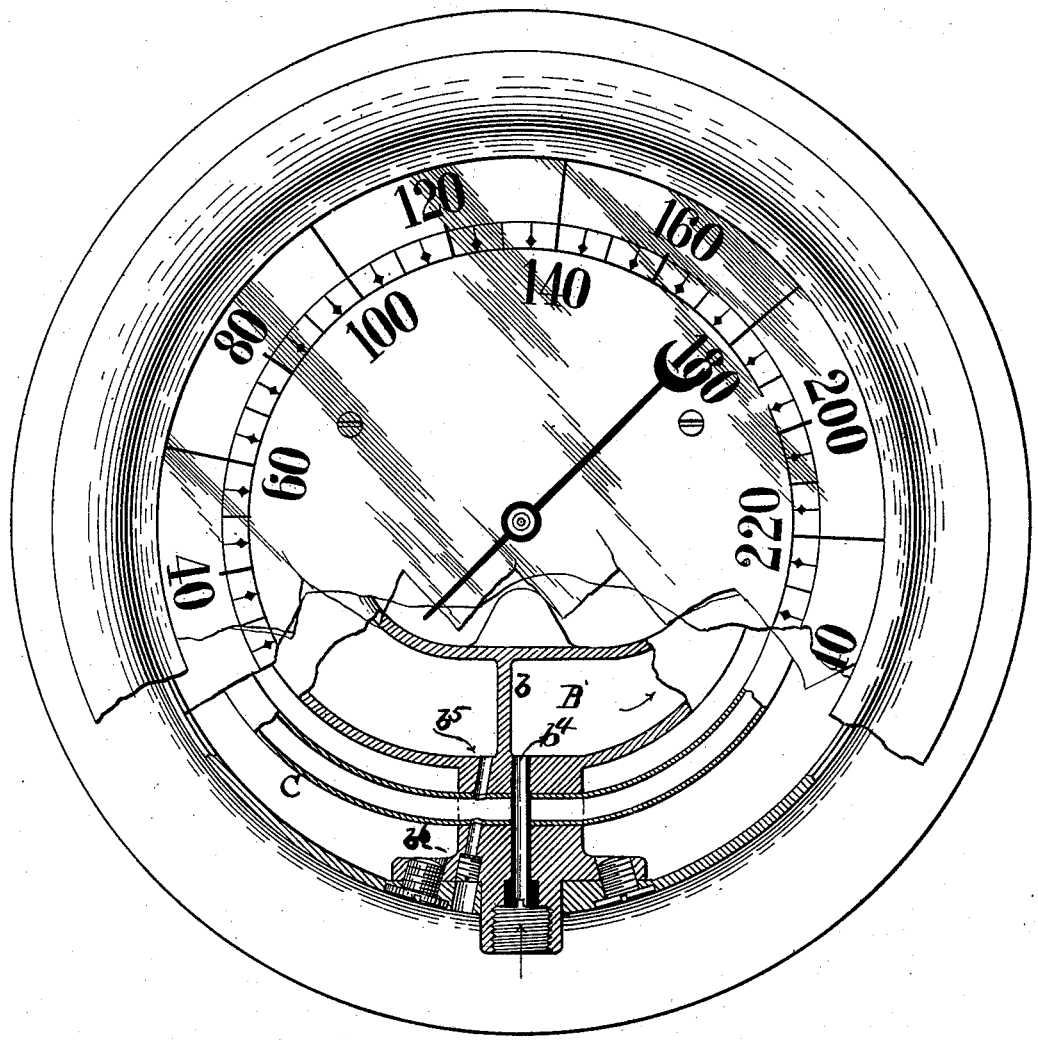

(No Model.) 3 Sheets—Sheet 1.
C. B. BOSWORTH & J. H. MILLETT.
PRESSURE GAGE.
No. 596,674. Patented Jan. 4, 1898.
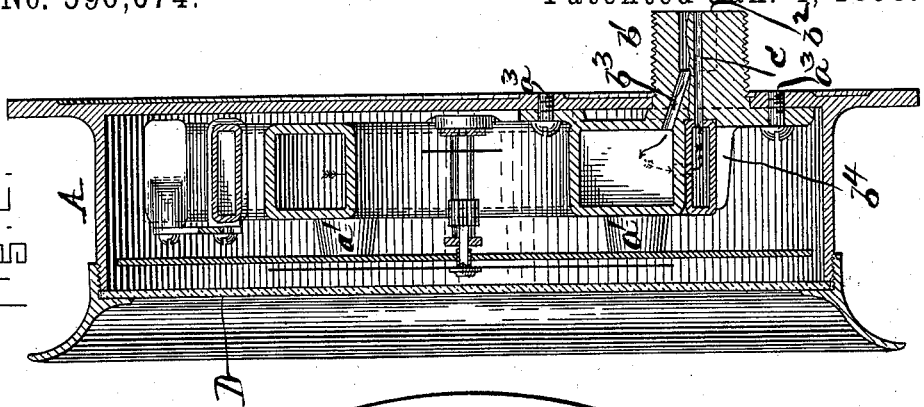
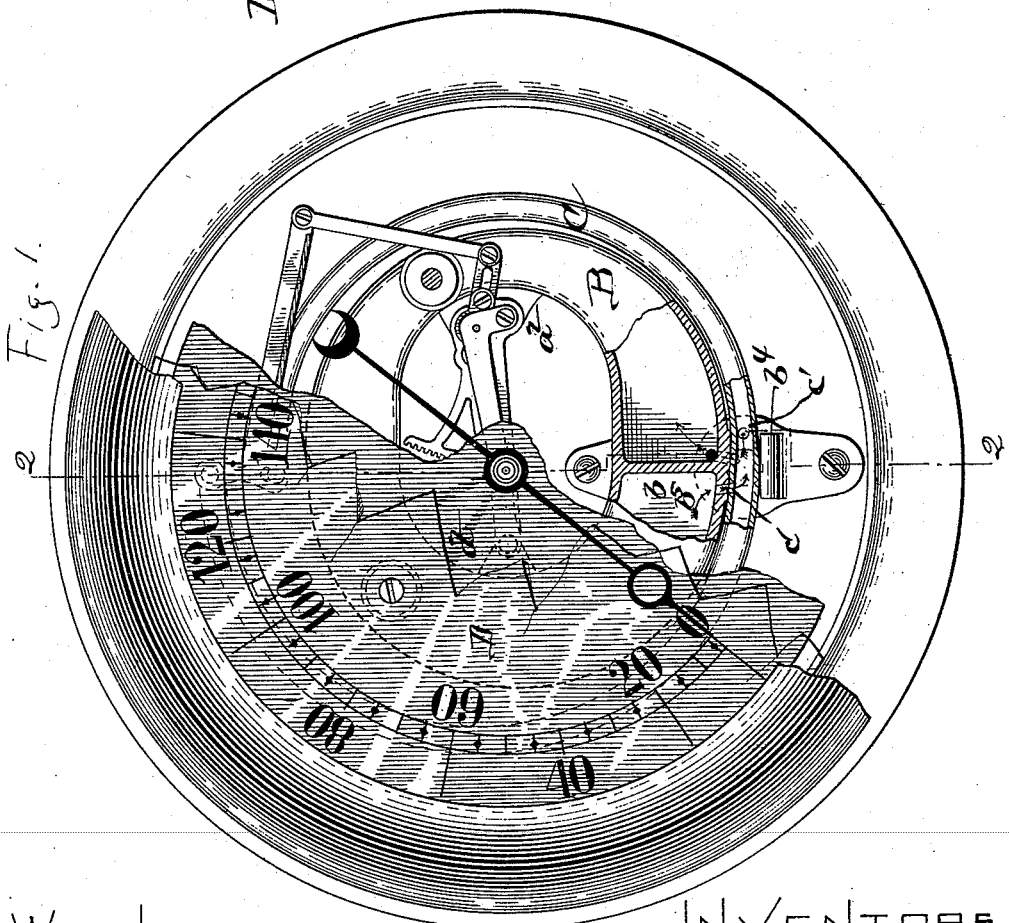

(No Model.) 3 Sheets—Sheet 2.
C. B. BOSWORTH & J. H. MILLETT.
PRESSURE GAGE.
No. 596,674. Patented Jan. 4, 1898.
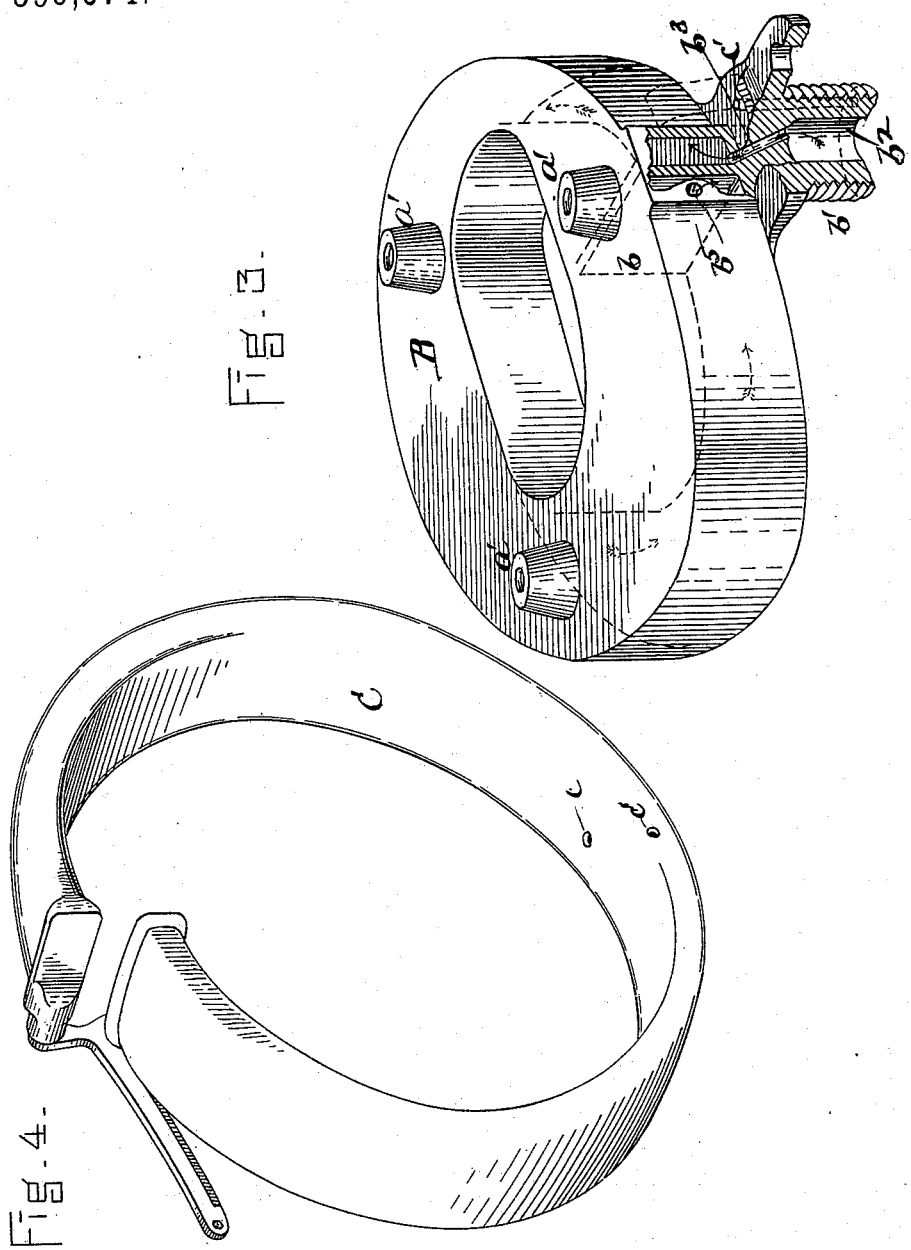
WITNESSES  INVENTORS
Leona E. Kidwell.  Charles Bartlett Bosworth,
  Joshua H. Millett,
  per W. H. Singleton,
    Atty.

(No Model.) 3 Sheets—Sheet 3.
C. B. BOSWORTH & J. H. MILLETT.
PRESSURE GAGE.

No. 596,674. Patented Jan. 4, 1898.

UNITED STATES PATENT OFFICE.

CHARLES BARTLETT BOSWORTH, OF EVERETT, AND JOSHUA HOWARD MILLETT, OF MALDEN, MASSACHUSETTS, ASSIGNORS TO THE CROSBY STEAM GAGE AND VALVE COMPANY, OF BOSTON, MASSACHUSETTS.

PRESSURE-GAGE.

SPECIFICATION forming part of Letters Patent No. 596,674, dated January 4, 1898.

Application filed January 24, 1896. Serial No. 576,679. (No model.)

*To all whom it may concern:*

Be it known that we, CHARLES BARTLETT BOSWORTH, residing at Everett, and JOSHUA HOWARD MILLETT, residing at Malden, in the county of Middlesex, State of Massachusetts, citizens of the United States, have invented certain new and useful Improvements in Pressure-Gages; and we do hereby declare the following to be a full, clear, and exact description of the invention, such as will enable others skilled in the art to which it appertains to make and use the same.

This invention relates to an improvement in pressure-gages. More especially does it relate to that class of gages in which a Bourdon tube is employed.

In the annexed drawings, Figure 1 represents the invention located within the ordinary steam-gage case, having a portion of the ring and dial removed in order to show the internal construction, part being in section. Fig. 2 represents a cross-section through Fig. 1 on the line 2 2. Fig. 3 represents in perspective view the water-chamber with certain portions broken away at the boss which connects it to the boiler. Fig. 4 represents in perspective view the Bourdon spring. Fig. 5 represents a similar view to Fig. 1, but showing a modification.

In the drawings the letter A represents an ordinary pressure-gage case, within which is placed the operative mechanism of the gage. Within this case is placed a water-chamber B. This water-chamber is made substantially ellipsoidal in shape and has a partition $b$. At this partition $b$ the chamber B is provided at one side with a threaded projection or boss $b'$. This projection $b'$ protrudes through a hole in the back of the case A and is for the purpose of connecting the steam-pipe of the boiler or other receptacle to which the pressure-gage is attached. This boss $b'$ has a hollow bore $b^2$, from which a passage $b^3$ leads to the interior of the water-chamber B on one side of the partition $b$.

Surrounding the water-chamber B is the usual Bourdon spring C, a projection $b^4$ holding the two snugly together. On the side of the partition $b$ away from the passage $b^3$ another passage $b^5$ opens from the interior of the water-chamber B into the interior of the Bourdon spring, as at $c$, and a passage $c'$ leads from the interior of the Bourdon spring through the boss or projection $b'$. To the protuberances $a'\ a'\ a'$ the dial D, with its figures, is connected, and to the projections or lugs $a^2$ the sector mechanism for conveying the movement of the tube-springs is attached. As the present invention has no relation to the precise form of this latter mechanism and any form will serve in connection with the parts described to exemplify the invention, a detailed description of such mechanism is not regarded as necessary.

By this construction the whole interior part of the gage is borne upon and becomes an integral part of the water-chamber B and is entirely independent of the case in which it may be located, except at the point of attachment of the screws $a^3\ a^3$, where it is secured to the back of the case. By this means the gage is not disturbed or influenced in any degree by any action of the case due to the change of temperature.

With this construction the fluid will enter the bore $b^2$ of the boss $b'$ and pass through the passage $b^3$ into the water-chamber B on one side of the partition $b$, thence around the water-chamber to the other side of the partition $b$, thence through the passage $b^5$ into the interior of the Bourdon spring C, and thence through the passage $c'$, the water-chamber having filled with the fluid.

In a construction such as described there is formed within the inner circle of the tube-springs a water-chamber of sufficient capacity and character that it will supply not only in the largest degree the tube-springs with water to protect them, but also tends to reduce the temperature about them when subjected to great heat.

All steam-pressure gages are required to have their Bourdon springs protected from the heat to which they may be subjected in use by some device containing water to supply them. This is ordinarily done by what is called a "siphon," generally consisting of a bent tube, and is located outside of and below the gage. In most cases this siphon is of such capacity as to afford but little benefit to the gage. Its importance lies in the fact that when the tube-springs are subjected to a temperature greater than that required to generate water into steam in use under pressure they will be upset or permanently change their form, so that they become inaccurate and unsafe. This occurs always when steam is admitted directly into the tube-springs of the gage, which often takes place from neglect in not filling the siphon, or from the small capacity of the siphon, or from the fact that the siphon is subjected to such heat as to convert the water in it into steam. It is therefore necessary for absolute protection to steam-gages where they are used in high temperatures that there be such a quantity of water as shall fully supply the tube-springs under all conditions, and it shall not be easily converted into steam by any heat which may be conveyed to it by any connection which the steam-gage may have to the boiler. It is believed that this device accomplishes all that is required in this regard because, first, the water-chamber when it is filled with water has present in it a body greater than can ever enter the springs, and thus will always reinforce them under all conditions of action or pressure; second, that this body of water is so disposed by the form of the water-chamber as to ameliorate or reduce the temperature which at any time may surround the springs and under no conditions of use can it be converted into steam by the connection of heat due to its attachment to the boiler; third, that all the operative parts of the gage and those which are liable to disturbances by a variable temperature, as by their expansion or contraction, are mounted upon this water-chamber of a comparatively uniform temperature and thus are affected or controlled to a very large extent by it.

Fig. 5 shows a modification of this device. In this form the connection of the water-chamber B is downward through the gage-case, as shown at $b^4$. This passage runs directly from the open air, where it is attached to a steam-boiler. The outlet from the chamber on the other side of the partition $b$ is by the passage $b^5$ into the Bourdon tube and thence outward to the open air. This passage is closed by a screw $b^6$. This form is simpler than that shown by the other figures. In this one, by inverting the gage so that the opening into the passage $b^4$ shall be uppermost, the water may be poured into such passage, thence passing into the water-chamber, and outward by the passage $b^5$, into the Bourdon tube C, and again outward to the open air, where it will appear when the passages and chamber are full, the screw closing the passage $b^5$ having been removed. Then upon replacing the screw $b^6$ the gage is ready for service.

Having described our invention, what we claim is—

1. In a pressure-gage the combination of a Bourdon spring with a water-chamber entirely located within the curve of the spring, as set forth.

2. In a pressure-gage the combination of the water-chamber and a Bourdon spring arranged one within the other and having a water-passage connecting the two, the water-chamber being provided with a boss or extension, such boss being provided with a passage leading into the water-chamber and a passage leading from the Bourdon tube, as set forth.

In testimony whereof we affix our signatures in presence of two witnesses.

CHARLES BARTLETT BOSWORTH.
JOSHUA HOWARD MILLETT.

Witnesses:
ARTHUR L. BOWKER,
OMAR H. GIBBS.